July 15, 1969     D. W. PRATT ET AL     3,455,188

ADJUSTABLE BORING CUTTER

Filed Sept. 11, 1967     2 Sheets-Sheet 1

INVENTORS
DONALD W. PRATT
CHARLES J. HOFFMAN

ATTORNEY

July 15, 1969    D. W. PRATT ET AL    3,455,188
ADJUSTABLE BORING CUTTER
Filed Sept. 11, 1967    2 Sheets-Sheet 2
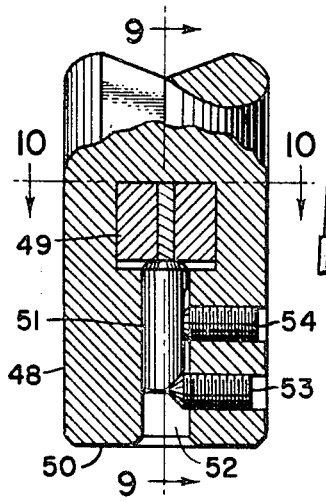
Fig. 8
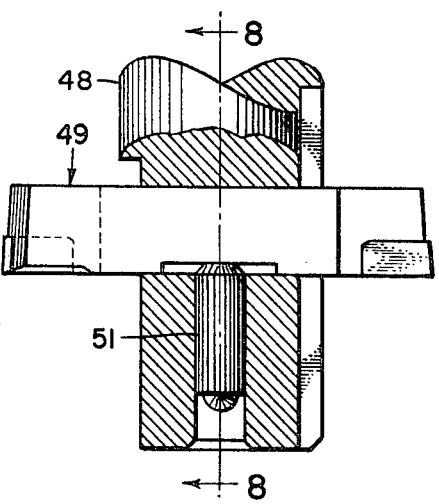
Fig. 9
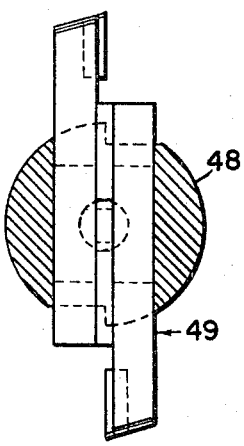
Fig. 10
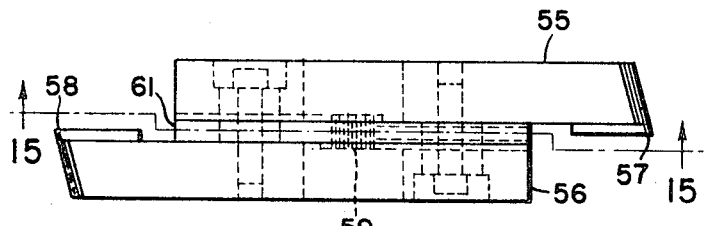
Fig. 11
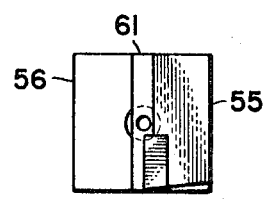
Fig. 12
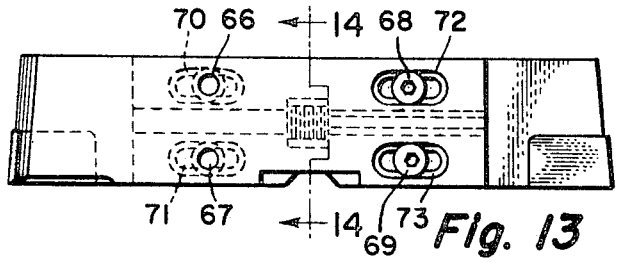
Fig. 13
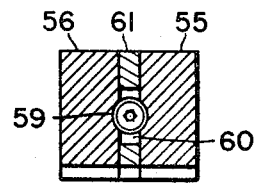
Fig. 14
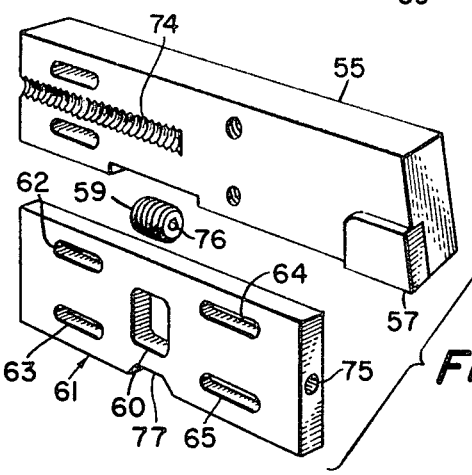
Fig. 16
Fig. 15
INVENTORS
DONALD W. PRATT
CHARLES J. HOFFMAN
ATTORNEY

United States Patent Office 3,455,188
Patented July 15, 1969

3,455,188
ADJUSTABLE BORING CUTTER
Donald W. Pratt, 740 Ross Road, Muskegon, Mich.
49441, and Charles J. Hoffman, Rte. 1, Twin Lake,
Mich. 49457
Filed Sept. 11, 1967, Ser. No. 666,845
Int. Cl. B23b 27/02
U.S. Cl. 77—58                                    5 Claims

ABSTRACT OF THE DISCLOSURE

An adjustable boring cutter with cutting points at the opposite ends thereof, and having a centering notch formed in the edge of a plate interposed between overlapped cutter sections, with adjusting means for altering the overlapped relationship to select the cutting diameter without altering the position of the notch with respect to the axis of rotation.

SUMMARY OF THE INVENTION

Holes of substantial size are commonly bored in workpieces through the use of a boring tool composed of a bar of sufficient length to reach the full depth of the hole, and a cutter with at least one cutting point extending radially from the axis of the bar a sufficient distance to produce the necessary hole diameter. This tool assembly is mounted for relative rotation with respect to the workpiece, and the general term "boring cutter," may include a number of sub-classes referred to as finishing cutters and special-purpose tools. One well-recognized form of these boring cutters is composed of overlapped cutter sections, each of which supports a cutting point. This results in an assembly extending along a diameter of the boring bar, with cutting action at the opposite ends. The distance between the cutting points corresponds to the diameter of the hole being cut, with minor qualifications. Adjustment of the diameter of the hole is obtained by adjusting the overlapped relationship of the cutter sections to alter the distance between the opposite ends of the cutting points.

It is common practice to provide a notch in the edge of the cutter assembly for engagement with a pin mounted in an axial hole in the cutting bar, in order to center the cutter assembly with respect to the axis of rotation. One difficulty with this conventional arrangement has been the necessity of remachining the notches whenever the overlapped relationship of the cutter sections is altered. Since the notch in the edge of the cutter assembly normally traverses both cutter sections, any change in the overlapped relationship necessarily results in a relative shifting of the walls defining the locating notch. If the conventional locating notch (which extends in a direction perpendicular to the overlapped faces of the cutter sections) is not re-machined so as to provide continuous surfaces across the junction between the two cutter sections, the result is a discontinuity at this point which results in sufficient deformity of the faces defining the notch to produce an inaccurate location of the cutter assembly with respect to the axis of rotation of the boring bar.

The present invention removes this problem entirely by placing the locating notch in an auxiliary locating plate interposed between the overlapped cutter sections, the cutter sections being cut away to eliminate entirely any engagement between them and the standard boring bar locating pin. The adjustment of the overlapped relationship of the cutter sections is obtained by the action of at least one screw disposed in an aperture in the locating plate, and having threaded engagement with at least one of the cutter sections. One form of the invention utilizes two screws, each of these having threaded engagement with one of the cutter sections and an aperture in the locating plate. Another form of the invention utilizes a single screw disposed in an aperture in the plate, and engaging both of the cutter sections where the periphery of the screw protrudes beyond the space defined by the opposite faces of the locating plate. The ends of the aperture in the locating plate are opposite the ends of the screws so that the screws remain axially fixed with respect to the locating plate, with the result that the cutter sections can be adjusted without disturbing the position of the locating plate with respect to the axis of rotation of the tool.

DETAILED DESCRIPTION

The several features of the invention will be analyzed in detail through a discussion of the particular embodiments illustrated in the accompanying drawings. In the drawings:

FIGURE 8 is a view of a modified form of the invention.

FIGURE 9 is a section on the plane 9—9 of FIGURE 8.

FIGURE 10 is a section on the plane 10—10 of FIGURE 8.

FIGURE 11 is a front elevation of the cutter assembly shown in FIGURES 8, 9 and 10.

FIGURE 12 is an end view of the cutter assembly shown in FIGURE 11.

FIGURE 13 is a plan view of the cutter shown in FIGURE 11.

FIGURE 14 is a section on the plane 14—14 of FIGURE 13.

FIGURE 15 is a section on the plane 15—15 of FIGURE 11.

FIGURE 16 is an exploded view showing the components of the cutter assembly shown in FIGURES 8 through 15.

Figure 1:
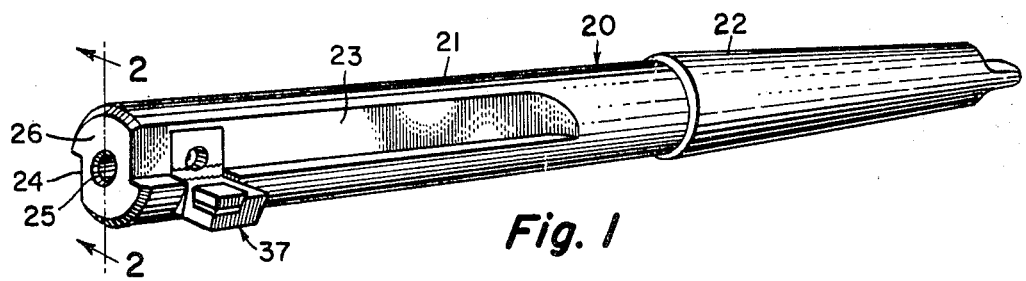
FIGURE 1 is a perspective view of a boring tool.
Figures 2, 3, 4:
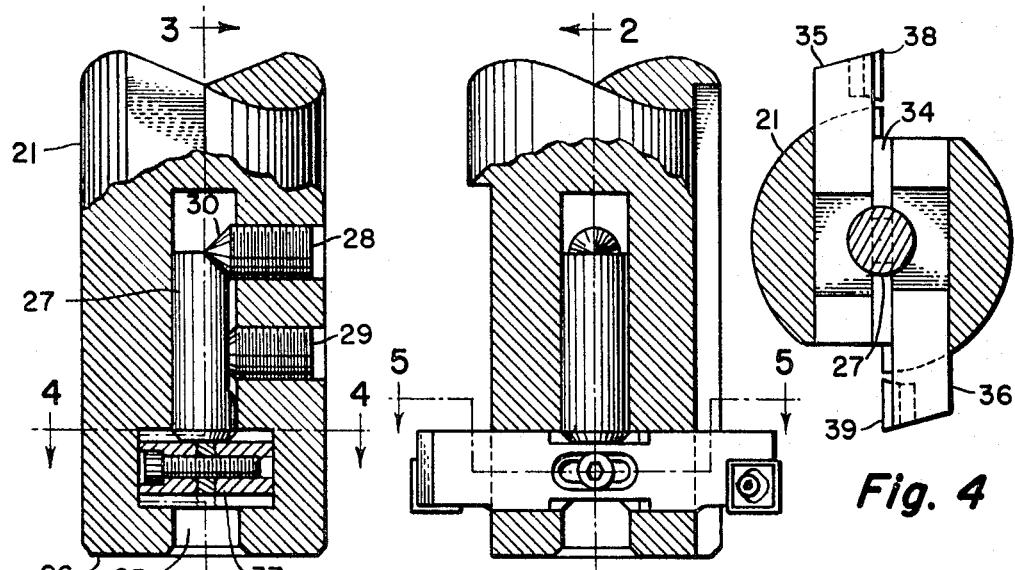
FIGURE 2 is a partial section on an enlarged scale on the plane 2—2 of FIGURE 1.
FIGURE 3 is a section on the plane 3—3 of FIGURE 2.
FIGURE 4 is a section on the plane 4—4 of FIGURE 2.

The boring tool generally indicated at 20 in FIGURE 1 includes the bar 21 having the driving end 22 provided with a standard taper for engagement with a receptacle on the machine in which the boring operation is to be performed. The passages 23 and 24 on the opposite sides of the bar 21 are provided to assure space for the movement of chips and cooling liquid. The bar has an axial bore 25 opening at the end 26 for receiving the locating pin 27. This pin is positioned axially by the combined effect of the screws 28 and 29. The screw 28 has a conical point 30 engaging a slanted surface on the end of the pin 27 to produce a force driving the pin 27 downward as shown in FIGURE 2. The desired adjusted position of the pin is then secured by the clamping effect of the screw 29.

Figures 5, 6, 7:
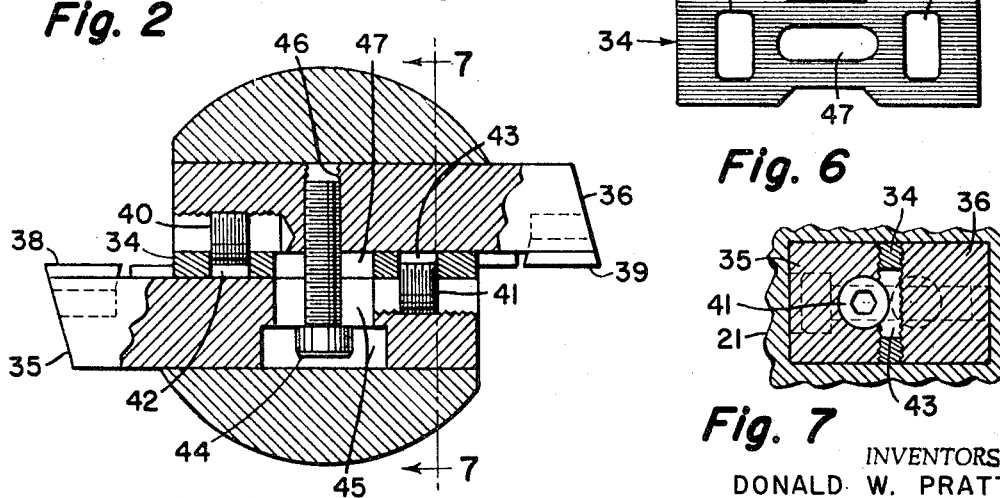
FIGURE 5 is a section on the plane 5—5 of FIGURE 3.
FIGURE 6 is a plan view of the locating plate used in the assembly shown in FIGURE 5.
FIGURE 7 is a section on the plane 7—7 of FIGURE 5.

The lower end of the pin 27, as seen in FIGURE 2, has a chamfered periphery for engagement with the surface 31 and 32 defining the edges of a locating slot 33 in the plate 34. This plate is interposed between the cutter sections 35 and 36 of the cutter assembly 37, which is received in an opening in the end of the bar 21. The cutter sections 35 and 36 are provided with the cutting points (sometimes referred to as "bits" or "inserts") 38 and 39, respectively, and the diameter cut by the assembly shown in FIGURE 1 is represented by the distance between the points 38 and 39. The adjustment of the cutter assembly to vary this distance is accomplished through the manipulation of the screws 40 and 41. These screws are received in threaded passages in their respective blade sections which embrace slightly more than 180 degrees around the axis of the screws. This arrangement results in the retention of the screws within the respective blade sections, while permitting a portion of the screws to project laterally into engagement with the recesses 42 and 43 in the locating plate 34. Adjustment of the screw 41 will therefore result in a shifting of the blade section 35 with respect to the locating plate 34, and adjustment section 36 with respect to the plate 34. These adjustments may be matched so that the plate can remain centrally located with respect to the axis of rotation of the bar 21 while projecting the cutting points 38 and 39 at equal distances on opposite sides. To facilitate the maintenance of a strict linear sliding engagement between the cutting sections 35 and 36, and the locating plate 34, the interengaging surfaces of these members are serrated with ridges. These ridges extend along the full length of the plate 34, as shown in FIGURE 6. The ridges function in the manner of guideways.

When the adjusted relative position of the cutter sections 35 and 36 has been obtained through manipulation of the screws 40 and 41, the locking screw 44 is tightened to maintain this position. This screw traverses the opening 45 in the cutter section 35, and is in threaded engagement with the hole 46 in the cutter section 36. This screw also traverses the central opening 47 in the plate 34. The relationship of the adjusting screws and the apertures in the locating plate is best shown in FIGURE 7. The length of the apertures 42 and 43 is selected to closely receive the screws 40 and 41 so that the ends of the apertures permit little or no relative axial displacement of the adjusting screws with respect to the plate 34.

The form of the invention shown in FIGURES 8 through 16 is mounted in a somewhat different, yet conventional, boring bar 48. The cutter assembly 49 is mounted in a diametral recess in the bar that is set back somewhat from the end 50. The locating pin 51 is slidably received within the axial aperture 52, and is positioned by the combined effect of the pressure screw 53 and the locking screw 54. These screws, as with the other screws utilized in this invention, are preferably of the standard type having axially-hexagonal recesses for receiving a so-called "Allen" wrench.

The overlapped blade sections 55 and 56 provide the cutting points 57 and 58, respectively, and the variation of the distance between these points is obtained through the manipulation of the single adjusting screw 59. This screw is received within the aperture 60 of the locating plate 61 interposed between the cutter sections 55 and 56. This plate has slots 62–65 for receiving the screws 66–69 which can be tightened to lock the adjusted relative overlapped relationship of the blade sections 55 and 56. The heads of these screws are received in shoulder recesses as shown at 70–73 in the cutter section 56 and are in threaded engagement with the opposite cutter section. The diameter of the screw 59 is such that it projects on either side of the space defined by the opposite faces of the locating plate 61, into threaded paths on the cutter sections 55 and 56 similar to the path 74 shown in FIGURE 16. The adjustment of the screw 59 is made possible by the access opening 75 in the locating plate 61, which extends axially opposite the hexagonal recess 76 in the screw 59. Where the plate 61 is proportionally thinner than as shown in FIGURE 16, the opening 75 may take the form of a slot. In either case, rotation of the screw 59 will project the cutter sections 55 and 56 equal amounts in opposite directions, maintaining the concentricity of the locating slot 77 with respect to the pin 51.

The particular embodiments of the present invention which have been illustrated and discussed herein are for illustrative purposes only and are not to be considered as a limitation upon the scope of the appended claims. In these claims, it is our intent to claim the entire invention disclosed herein, except as we are limited by the prior art.

We claim:
1. An adjustable boring cutter having overlapped cutter sections, screw means having threaded engagement with at least one of said sections for adjusting the overlapped relationship of said sections, locking means for securing an adjusted relationship, and centering means for interengagement with a pin mounted for axial movement in a boring bar adapted to receive said cutter, wherein the improvement comprises:
   a locating plate interposed between said cutter sections, and having a notch in an edge thereof providing said centering means, said plate having an aperture receiving said screw means, the ends of said aperture being opposite the ends of said screw means, respectively.
2. A cutter as defined in claim 1, wherein said screw means is disposed on an axis outside the space between the planes defining the faces of said plate.
3. A cutter as defined in claim 2, wherein said screw means includes two screws, each engaging one of said sections and an aperture in said plate.
4. A cutter as defined in claim 1, wherein said screw means is a screw engaging both said sections, and said plate has an access opening extending parallel to the axis of said screw opposite the end thereof to an edge of said plate.
5. A cutter as defined in claim 1, wherein said cuter sections have recesses in adjacent edges to expose the portion of said plate containing said notch.

References Cited

UNITED STATES PATENTS 1,853,971    4/1932    Giern _____ 77—58

GERALD A. DOST, Primary Examiner